(12) United States Patent
Chin et al.

(10) Patent No.: US 11,144,514 B2
(45) Date of Patent: Oct. 12, 2021

(54) TECHNIQUES FOR PROVIDING USER INTERFACE ENHANCEMENTS FOR ONLINE CONTENT MANAGEMENT SYSTEM VERSION HISTORIES

(71) Applicant: Dropbox, Inc., San Francisco, CA (US)

(72) Inventors: Andrew Chin, San Francisco, CA (US); Wei Feng, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 449 days.

(21) Appl. No.: 16/368,698

(22) Filed: Mar. 28, 2019

(65) Prior Publication Data
US 2019/0220446 A1    Jul. 18, 2019

Related U.S. Application Data

(63) Continuation of application No. 14/985,050, filed on Dec. 30, 2015, now Pat. No. 10,289,693.

(51) Int. Cl.
*G06F 7/00* (2006.01)
*G06F 16/18* (2019.01)
*G06F 40/103* (2020.01)

(52) U.S. Cl.
CPC ........ *G06F 16/1873* (2019.01); *G06F 40/103* (2020.01)

(58) Field of Classification Search
CPC .................................................. G06F 16/1873
USPC ....................................................... 707/758
See application file for complete search history.

(56) References Cited

U.S. PATENT DOCUMENTS

| | | | |
|---|---|---|---|
| 7,149,760 B1 | 12/2006 | Breuer | |
| 7,246,140 B2* | 7/2007 | Therrien | G06F 11/1448 |
| 7,289,973 B2* | 10/2007 | Kiessig | G06F 17/30067 |
| 7,856,424 B2 | 12/2010 | Cisler et al. | |
| 7,900,142 B2 | 3/2011 | Baer | |
| 8,099,392 B2* | 1/2012 | Paterson | G06F 11/1451 |
| | | | 707/654 |
| 8,364,648 B1* | 1/2013 | Sim-Tang | G06F 17/30368 |
| | | | 707/674 |
| 8,825,597 B1 | 9/2014 | Houston et al. | |
| 9,020,887 B2 | 4/2015 | Ngo et al. | |
| 9,430,229 B1* | 8/2016 | Van Zijst | G06F 9/3844 |
| 2004/0221231 A1 | 11/2004 | Madril, Jr. et al. | |
| 2005/0203969 A1 | 9/2005 | Kawabe | |
| 2005/0228816 A1* | 10/2005 | McCauley | G06F 17/30309 |

(Continued)

OTHER PUBLICATIONS

Chin, U.S. Appl. No. 14/985,050, filed Dec. 30, 2018, Final Office Action, dated Jul. 25, 2018.

(Continued)

*Primary Examiner* — Eliyah S. Harper
(74) *Attorney, Agent, or Firm* — Hickman Becker Bingham Ledesma LLP (57) ABSTRACT

A system and method for displaying an enhanced version history user interface for an online content management system. In one embodiment, a version history user interface includes version history entries that represent primary events and anchor events. In another embodiment, a preview version history user interface is displayed that allows a user to preview a version of a content item. In another embodiment, a restore action process allows a user to restore a previous version of a content item to be the new current version of the content item.

20 Claims, 7 Drawing Sheets

(56) References Cited

U.S. PATENT DOCUMENTS

| | | | |
|---|---|---|---|
| 2006/0041558 A1* | 2/2006 | McCauley | G06F 17/30309 |
| 2007/0074107 A1* | 3/2007 | Lessing | G06F 17/30333 |
| | | | 715/201 |
| 2007/0094312 A1 | 4/2007 | Sim-Tang | |
| 2008/0034011 A1* | 2/2008 | Cisler | G06F 17/30053 |
| 2008/0177994 A1* | 7/2008 | Mayer | G06F 9/4418 |
| | | | 713/2 |
| 2011/0184998 A1* | 7/2011 | Palahnuk | G06F 11/1464 |
| | | | 707/827 |
| 2013/0166522 A1* | 6/2013 | Kaufmann | G06F 17/30353 |
| | | | 707/695 |
| 2014/0136496 A1 | 5/2014 | Kuo | |
| 2015/0180894 A1* | 6/2015 | Sadovsky | G06F 3/0481 |
| | | | 726/22 |
| 2015/0278024 A1 | 10/2015 | Barman et al. | |
| 2017/0185687 A1* | 6/2017 | Pai | G06Q 10/101 |
| 2017/0192856 A1 | 7/2017 | Chin et al. | |

OTHER PUBLICATIONS

Chin, U.S. Appl. No. 14/985,050, filed Dec. 30, 2015, Office Action, dated Feb. 28, 2018.
Chin, U.S. Appl. No. 14/985,050, filed Dec. 30, 2015, Notice of Allowance, dated Jan. 11, 2019.
Chin, U.S. Appl. No. 14/985,050, filed Dec. 30, 2015, Advisory Action, dated Nov. 2, 2018.
Collins-Sussman et al., "Version Control with Subversion" For Subversion 1.5 (Comopiled from r3305), dated 2002, 407 pages.

\* cited by examiner

| Wednesday, July 1, 2015 | | | | |
|---|---|---|---|---|
| TPS Report | 4:25 PM | Edited by you | 100 MB | *Current Version* [Open] |
| TPS Report | 4:20 PM | Edited by you | 100 MB | |
| TPS Report | 4:12 PM | Edited by you | 92 MB | |
| TPS Report | 3:25 PM | Edited by you | 90 MB | [Preview] [Restore] [Download] |
| TPS Report | 2:45 PM | Edited by you | 59 MB | |

*You moved the file to folder 2014*

*You renamed the file from "TPS Report draft.pdf" to "TPS Report.pdf"*

| Thursday, June 25, 2015 | | | | |
|---|---|---|---|---|
| TPS Report draft | 3:25 PM | Edited by Mary Smith | 59 MB | |
| TPS Report draft | 2:22 PM | Edited by Mary Smith | 59 MB | |
| TPS Report draft | 1:45 PM | Created by Mary Smith | 59 MB | |

Callouts: 420 (Open), 410 (row at 3:25 PM), 430 (Download)
Reference numeral: 400

*Figure 4*

| Wednesday, July 1, 2015 | | | |
|---|---|---|---|
| TPS Report | 5:35 PM | Restored by you (from today at 3:25 PM) | 90 MB  *Current Version*  [Open] |
| TPS Report | 4:25 PM | Edited by you | 100 MB |
| TPS Report | 4:20 PM | Edited by you | 100 MB |
| TPS Report | 4:12 PM | Edited by you | 92 MB |
| TPS Report | 3:25 PM | Edited by you | 90 MB |
| TPS Report | 2:45 PM | Edited by you | 59 MB |

*You moved the file to folder 2014*

*You renamed the file from "TPS Report draft.pdf" to "TPS Report.pdf"*

| Thursday, June 25, 2015 | | | |
|---|---|---|---|
| TPS Report draft | 3:25 PM | Edited by Mary Smith | 59 MB |
| TPS Report draft | 2:22 PM | Edited by Mary Smith | 59 MB |
| TPS Report draft | 1:45 PM | Created by Mary Smith | 59 MB |

TECHNIQUES FOR PROVIDING USER INTERFACE ENHANCEMENTS FOR ONLINE CONTENT MANAGEMENT SYSTEM VERSION HISTORIES

CROSS-REFERENCE TO RELATED APPLICATION

This application is a continuation of U.S. patent application Ser. No. 14/985,050 filed Dec. 30, 2015, the entire contents of which is hereby incorporated by reference as if fully set forth herein.

TECHNICAL FIELD

The present application relates to online content management systems. More specifically, the example embodiment(s) of the present disclosure described below relate to providing enhanced user interfaces for the version history of an online content management system.

BACKGROUND

Multiple users often collaborate on electronic files. These users often implement their own personal techniques for communicating what changes have been made across versions of a file. In some cases, users will use file-naming conventions to communicate information about the electronic file (e.g., naming a file with the date and/or user that last modified it). In other cases, users will communicate information through a third-party tool (e.g., email or instant messenger) to convey information about when a specific version of a file was created, or what has changed in a file. Some users use native features of the file itself to communicate this information. For example, some users utilize Microsoft Word's track changes feature to comment about what changes are being made by a particular user and when those changes were made. Other users manually inspect multiple versions of a particular file to determine what changes have been made to a file. These existing processes are cumbersome and require significant time investment by users to understand the changes that occur to a file over time. These processes make it difficult for users to restore a file to a particular previous version, because the user must manually review multiple sources of information in order to understand the contents of various versions of files.

Some users store content items with online content management systems. Such systems typically allow users to upload a content item to a server computer accessible via the Internet or another communications network. Users can access the content item from their personal computing device. One well-known online content management system is the Dropbox™ file hosting service provided by Dropbox, Inc. of San Francisco, Calif. Storing a content item with an online content management system allows users to back up, share, synchronize, access, and store their content items.

Multiple users may use an online content management system to collaborate on a content item. A version history in an online content management system allows users to view multiple versions of a content item over time, however, it only provides limited information about the changes made to versions of a content item over time and does not provide an easy way for users to preview and/or restore old versions of a content item.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present disclosure are illustrated by way of example, and not in way by limitation, in the figures of the accompanying drawings and in which like reference numerals refer to similar elements and in which.

DESCRIPTION OF THE EXAMPLE EMBODIMENT(S)

In the following description, for the purposes of explanation, numerous specific details are set forth in order to provide a thorough understanding of the example embodiment(s) in the present disclosure. It will be apparent, however, that the example embodiment(s) may be practiced without these specific details. In other instances, well-known structures and devices are shown in block diagram form in order to avoid unnecessarily obscuring the example embodiment(s).

Online Content Management System

Today, many users host their personal digital information with online content management systems. Such online content management systems allow users to upload their personal digital information for storage at system-operated server computers accessible to user computing devices via the Internet or other communications network. One well-known online content management system is the Dropbox™ file hosting service provided by Dropbox, Inc. of San Francisco, Calif. Storing personal digital information with an online content management system provides a number of benefits to users. For example, such systems typically allow users to back up, share, synchronize, access and store their hosted digital information.

The online content management system may host users' content items. A content item includes a collection of digital information. Some non-limiting examples of a content item include, but are not limited to, a word processing document, a spreadsheet document, a digital image, and other types of files, documents, and digital media. A content item may correspond to a standardized or conventional file type such that the content of the content item conforms to a standardized or conventional data format associated with that file type. Some standardized and conventional file types to which a content item may correspond to include, but are not limited to, image file types (e.g., .jpg, .tiff, .gif, .png), music file types (e.g., .mp3, .aiff, .m4a, .wav), movie file types (e.g., .mov, .mp4, .m4v), word processing file types (e.g., .doc, .docx, .pages), presentation file types (e.g., .ppt, .pptx, .key), spreadsheet file types (e.g., .xls, .xlsx, .numbers), web page file types (e.g., .htm, .html), and text file types (e.g., .txt). While in some instances a content item corresponds to a standardized or conventional file type, a content item corresponds to a proprietary or unknown file type in other instances. A content item can also include folders or other mechanisms of grouping content items together with different behaviors, such as collections, playlists, albums, etc. For example, an account can include a photos folder that is intended for photos and that provides specific attributes and actions tailored for photos; an audio folder that provides the ability to play back audio files and perform other audio related actions; or other special purpose folders.

The above discussion provides just some examples of possible types of content items that may be among a user's content items hosted with the online content management system. A user may host all of these types of content items with the online content management system, or a subset or a superset thereof.

The online content management system allows multiple user accounts to collaborate on one or more content items. For example, the online content management system stores permission settings that determine which individual user accounts can view, edit, modify, and/or delete a content item. The online content management system can further store permission settings for a team of multiple user accounts, as well as permission settings for a single user account. In one embodiment, content items in the online content management system may be arranged in folders and the folders may be further arranged in other folders. A folder may have its own permission settings regarding what user accounts can view, edit, modify and/or delete a content item.

In one embodiment, an online content management system supports content item version control. When a user modifies and/or saves a content item in the online content management system, a new version of the content item is created and stored in the online content management system. A user can access older versions of the content item in the online content management system.

An online content management system synchronizes data across multiple users. For example, when multiple users are collaborating on a shared content item, the online content management system notifies and updates the user computing devices about changes to that shared content item. Maintaining synchronized access to a shared content item in an online content management system ensures that the users have access to the latest content item.

User computing devices can access the online content management system via various client systems, including, but not limited to, web browsers, mobile device apps, desktop computer applications, and/or desktop application plugins.

An online content management system may store various data regarding the content item, and the organization of a content item. A namespace is an abstraction of the root directory of a more traditional file system directory tree. A namespace ID identifies a namespace. Each user in an online content management system has its own root namespace. In addition, every shared folder is a namespace which can be mounted within one or more root namespaces. Every content item in an online content management system can be uniquely identified by using a namespace ID and a relative file path. Alternatively, a content item in an online content management system can be uniquely identified by using a file object ID, which is a representation of various metadata regarding the content item.

Each content item in the online content management system may be broken into a series of blocks that are stored in the online content management system. For example, SampleFile.doc may be broken up into three blocks b1, b2, and b3. The online content management system may store a blocklist that can uniquely identify the contents of the content item. A blocklist is a list of hashes of the individual blocks of a content item. In the same example, the blocklist for SampleFile.doc may be "h1,h2,h3" where h1 is the hash of block b1, h2 is the hash of block b2, and h3 is the hash of block b3. The online content management system may further store a journal ID, which is an ID that is monotonically increasing within a namespace A server file journal is a database of the online content management system that includes several columns, including namespace ID, namespace relative path, blocklist, and journal ID. Each row in the server file journal represents a particular change to a content item. The server file journal may contain entries every time a content item is added, edited, or restored. The server file journal may also contain entries for minor changes to a content item, such as when a content item moved, a content item is renamed, a content item is shared, or a content item is unshared. The server file journal may also contain an entry for when a user has left a comment regarding the content item in the online content management system. The server file journal may also contain entries for other minor changes to a content item, such as when a namespace is mounted or ummounted.

Version History User Interface

Figure 1:
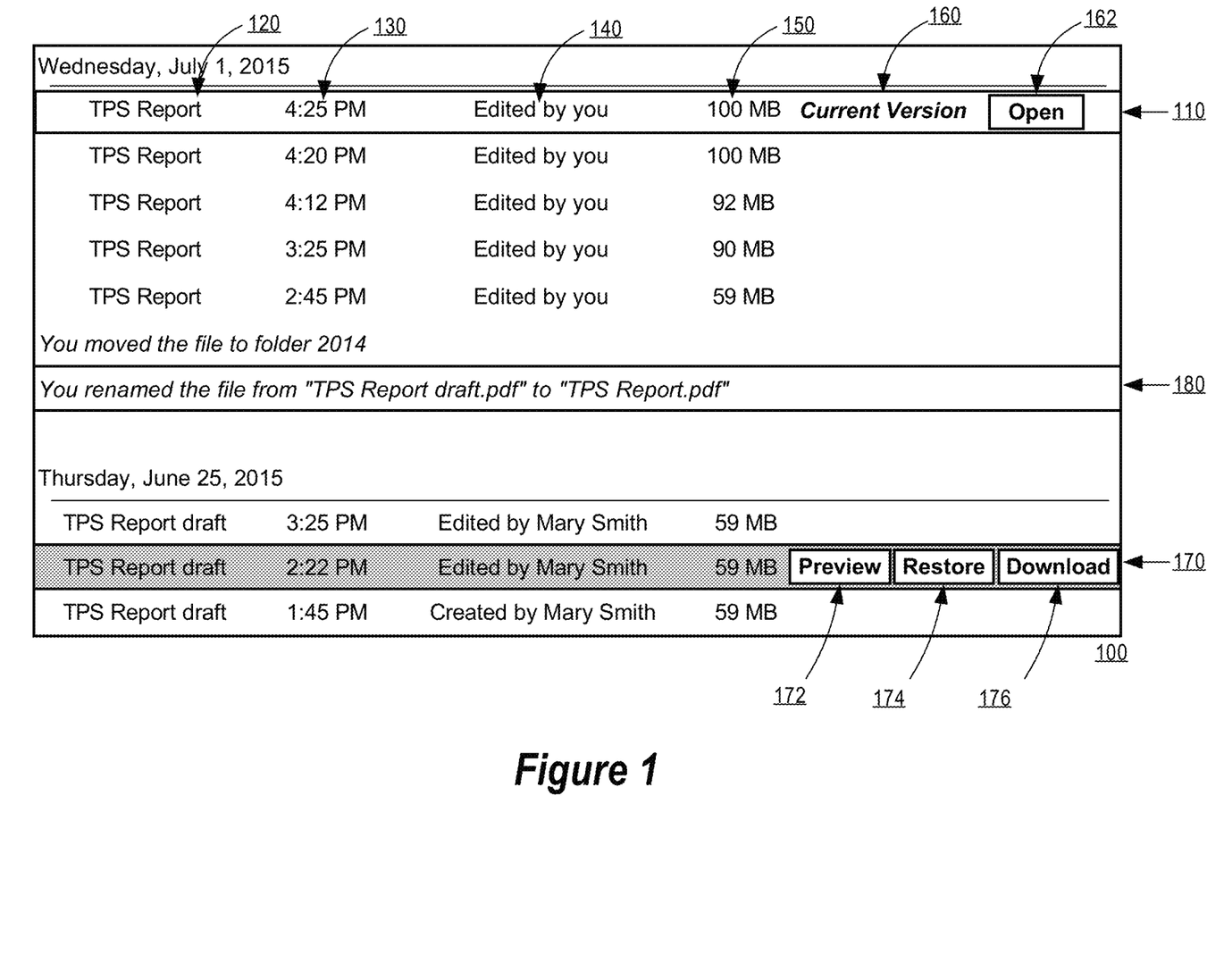
FIG. 1 is a diagram of an example version history user interface.

FIG. 1 depicts a version history user interface 100 of a content item, according to one embodiment. Version history user interface 100 includes version history entries that describe the history of revisions performed on the content item stored in the online content management system. Version history entry 110 is an example of a primary event version history entry. A primary event version history entry is a version history entry that depicts a primary event. A primary event is a major change to a content item and includes, but is not limited to, the following: a creation event, an edit event, or a restoration event. A creation event occurs when a user creates a new content item. An edit event occurs when a user edits or saves an existing content item. A restoration event occurs when a user restores a version of a content item. For example, version history entry 110 is a primary event version history entry that indicates that a content item has been edited by an edit event. A primary event version history entry corresponds to a version of the content item, and may be used to perform a restore action if the primary event version history is not the current version of the content item.

Primary event version history entry 110 may include one or more fields that provide helpful information to a user regarding the content item. For example, version history entry 110 includes field 120 that describes the filename of the content item. Field 120 may include the string filename of the content item. In one embodiment, field 120 may optionally include the relative path of the content item. Field 120 may also include a file type icon that depicts the type of file that the content item is. For example, if a content item is a ".pdf" file, field 120 may include an icon for the ".pdf" file type. Including information about what the file is named and/or its file type is helpful to educate users about what content item they are looking at. By looking across the various version history entries in version history user interface 100, a user can understand how the file name and/or file type of the content item has changed over time.

Primary event version history entry 110 may include field 130 that indicates the timestamp of the version history entry. In this example, field 130 indicates that the content item was edited and saved at 4:25 PM on Wednesday, Jul. 1, 2015. By looking across the various version history entries in version history user interface 100, a user can understand when changes were made to the content item by looking at timestamps included in primary event version history entries. In one embodiment the version history user interface 100 is grouped and sorted by timestamps. However, in other implementations, the version history user interface 100 may be grouped and/or sorted by another field.

Primary event version history entry 110 may include field 140 that indicates the source of the primary event version history entry. In one embodiment, field 140 may indicate what user created, edited, or restored the content item. For example, field 140 may include the user name, the full name, and/or another user identifier of the user that created, edited, or restored the content item. In one embodiment, field 140 may further include an icon or graphic that corresponds to the user that created, edited, or restored the content item, such as an avatar graphic or a profile photo. Field 140 may include a description of the action performed by the user that corresponds to the primary event (e.g., created, edited, restored, etc.). Field 140 may further include an identification of the source device that created, edited, or restored the content item (e.g., the type of device, the name of the device, etc.) By including information that indicates the source of the primary event version history entry in version history user interface 100, a user can easily understand what actions have been performed to the content item.

Primary event version history entry 110 may include field 150 that indicates the file size of the version of the content item. By including information that indicates the file size of the content item in the primary event version history entry, a user can easily understand how the content item has changed over time when looking at the version history user interface 100.

Primary event version history entry 110 may include field 160 that indicates that the corresponding version of the content item is the current version of the content item. In one embodiment, only a single version history entry in version history user interface 100 will identify the current version of the content item. In another embodiment, all version history entries in version history user interface 100 will identify if they are the current version of the content item. This may occur where two versions of the content item are identical (e.g., after a restore action has been performed). In one embodiment, the current version of the content item is not identified via a field, but is instead identified through some other graphical indication. For example, the current version of the content item may be identified via an icon (e.g., a star or a checkmark), a different color background for the version history entry, a stylized border around the version history entry, or some other graphical indication. Indicating the current version of the content item in the version history user interface 100 is helpful so that a user understands what version represents the latest version of the content item.

Primary event version history entry 110 may include an open button 162. By selecting open button 162, a user can open the version of the content item associated with primary event version history entry 110. In one embodiment, the open button 162 may be omitted and the entire primary even history entry 110 may be clickable. In another embodiment, open button 162 is not included in the primary event version history entry, but is rather included outside the version history user interface. Additionally, primary event version history entry 110 may optionally include another field that indicates the version number of the content item that corresponds to the primary event version history entry, however, this feature is not depicted.

Version history user interface 100 may include version history entry 170. Version history entry 170 is another example of a primary event version history entry. In this example, primary event version history entry 170 depicts a version history entry that is not associated with the current version of the content item. Furthermore, in this example, primary event version history entry 170 depicts a version history entry that is currently being selected (e.g., via a mouse-over or a touch gesture). Primary event version history entry 170 may be displayed with a graphical indication to indicate that the version history entry is currently being selected (e.g., different background color for the version history entry, a styled border around the version history entry, etc.)

Primary event version history entry 170 may include a preview button 172. When Preview button 172 is selected, the system will display a preview user interface of the corresponding version of the content item, as will be described below. When restore button 174 is selected, the system will perform a restore action to restore the corresponding version of the content item to be the new current version of the content item, as will be described below. When download button 176 is selected, the system will allow a user to download a local copy of the corresponding version of the content item.

Anchor Event Version History Entries

Version history user interface includes version history entry 180. Version history entry 180 is an example of an anchor event version history entry. An anchor event version history entry depicts when an anchor event has been detected for a content item. An anchor event is a minor change to the content item. Typically, an anchor event is an event that does not change the substantive content of the content item, but may be helpful for a user to see. For example, an anchor event may indicate that the content item has been moved, the content item has been renamed, the content item has been shared (e.g., a content item has been shared with a collaborator user or a collaborator user has joined a shared folder), and/or the content item has been unshared (e.g., the content item has been unshared with a collaborator user or a collaborator user has left a shared folder). In one embodiment, an anchor event may indicate that the content item has been mounted or unmounted from a namespace. In one embodiment, an anchor event may indicate that the content item has been deleted. In one embodiment, an anchor event may indicate that a user has left a comment regarding the content item in the online content management system.

For example, version history entry 180 is an anchor event version history entry that indicates that a content item has been renamed. In one embodiment, an anchor event version history entry may not be used to perform a restore action, and accordingly, will not contain a preview button, a restore button, and/or a download button. Anchor event version history entries are helpful to users that are working on a content item, because they provide meaningful information about minor changes to the content item over time. In one embodiment, anchor event version history entry may further include an icon identifying the type of anchor event associated with the anchor event version history entry. In another embodiment, an anchor event version history may include a timestamp of when the anchor event occurred.

In one embodiment, anchor event version history entries are formatted differently than primary event version history entries. For example, anchor event version history entries may be greyed out, have a smaller font size, or may be italicized. By displaying anchor event version history entries differently than primary event version history entries, a user can easily recognize the different types of events that have been performed on the content item over time and can easily distinguish between anchor events and primary events.

Although this and other embodiments described throughout this application are described with reference to "buttons", these embodiments can be implemented with alternative graphical user interface components, such as touch gestures, file menu options, right-click menu choices, mouse gestures, etc.

Version History User Interface Filtering and Searching

In one embodiment, a user may filter the version history user interface 100 by one or more of the fields included in the version history user interface. In another embodiment, a user may search the version history user interface 100 by one or more fields included in the version history user interface. For example, a user may be able to filter or search by file name, modified date, modified time, the user that made a modification to the content item, or the file size. Alternatively, a user may be able to filter the version history user interface so that it only shows primary event version history entries, or so that it only shows anchor event version history entries. Alternatively, a user may be able to filter the version history user interface so that it only shows particular types of version history entries (e.g., primary event version history entries, anchor event version history entries, or a particular type of primary event version history entry or anchor event version history entry).

Aggregating Events into a Single Version History Entry

In one embodiment, every event of a content item has its own event version history entry in a version history user interface. For example, every time a content item is created, edited, and/or restored, a new primary event version history entry is included in the version history user interface. However, sometimes multiple consecutive events should be grouped together into a single version history entry. For example, some users tend to compulsively save a content item that they are working on, even though they have not made significant changes. Alternatively, some operating systems repeatedly autosave a file in an online content management system. Each save of the content item is a separate edit event, however, including multiple primary event version history entries on a version history user interface may be cumbersome for a user to navigate, as those repeated edit events are likely related to one another. In one embodiment, if the system detects multiple consecutive primary events or anchor events, the system will wait a predetermined amount of time (e.g., 1 hour) and will only display a single version history entry representing the most recent event of that type of event over that predetermined amount of time. The predetermined amount of time may be based on a configurable setting of the online content management system. By waiting the predetermined amount of time, the system can aggregate multiple primary events or anchor events into a single primary event version history entry, thereby simplifying the version history user interface.

Customized Version History User Interface for a New User

In one embodiment, if a new user gains access to a content item (e.g., an existing user shared the content item with the new user), they will view a customized version history user interface. For example, in one embodiment, a permission setting can be used to customize the types of version history entries that can be viewed by the new user. The permission setting can be configurable by the online content management system. In one embodiment, the existing user can configure the permission setting. In another embodiment, the new user will not be able to see the version history entries that predate the time when the new user gained access to the content item. By providing these customized version history user interfaces for a new user, an existing user can be sure that sensitive information related to prior versions of the content item are not viewable by the new user.

Preview User Interface

Figure 2:
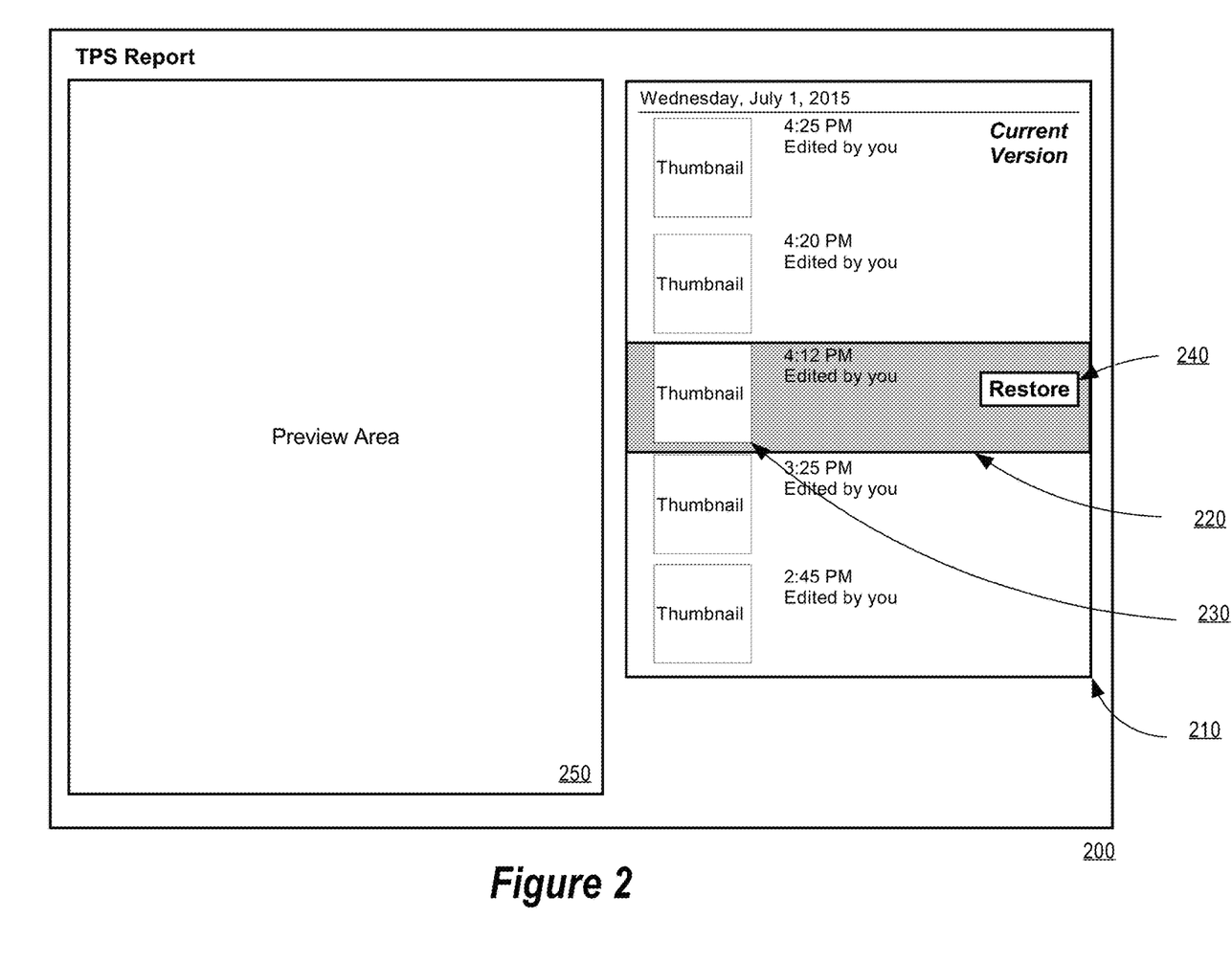
FIG. 2 is a diagram of an example preview version history user interface

FIG. 2 is a depiction of a preview user interface 200, according to one embodiment. Preview user interface 200 allows a user to preview a version of a content item. Preview user interface 200 may include a preview navigation panel 210. Preview navigation panel 210 is an abbreviated version of the version history user interface. In one embodiment, a preview navigation panel contains substantially the same user interface elements as the version history user interface. In another embodiment, the preview navigation panel may omit one or more user interface elements of the version history user interface. Preview navigation panel 210 is one example embodiment of a preview navigation panel.

Preview navigation panel 210 includes preview version history entry 220. In one embodiment, a preview navigation panel may include a preview version history entry for every version history entry in the version history user interface. In another embodiment, preview navigation may include only a subset of version history entries. For example, preview navigation panel 210 only includes preview version history entries that correspond to primary event version history entries and omits preview version history entries that correspond to anchor event version history entries. Preview navigation panel 210 may be a scrollable interface to allow viewing older entries.

Preview navigation panel 210 may use a graphical indication to identify the currently selected preview version history entry. For example, preview version history 240 is identified as the currently selected preview version history entry because the background color is shaded grey. Other graphical indications can be used to identify the currently selected preview version history entry (e.g., background color, border color, an icon, etc.)

Preview version history entry 220 may include a thumbnail 230. Thumbnail 230 may include a visual representation of the version of the content item that corresponds with the given preview version history entry. In one embodiment, thumbnail 230 may be a depiction of the beginning of the content item. In another embodiment, thumbnail 230 may be a depiction of an excerpt of the content item that was revised in that specific version of the content item, if the entry corresponds to an edit primary event. Thumbnails allow a user to easily navigate different versions of the content item in the preview user interface.

Preview version history entry 220 may include a restore button 240. When a user selects restore button 240, the system will perform a restore action to restore the corresponding version of the content item to be the new current version of the content item, as will be described below.

Preview user interface 200 may include a preview area 250. Preview area 250 provides a preview of the currently selected version of the content item. For example, preview area 250 depicts the version of the content item associated with preview version history entry 220. Preview area 250 may allow the user to navigate through the content item. For example, if the content item is a word processing document, preview area 250 may depict the word processing document, and allow the user to scroll through the word processing document. Providing a preview area 250 allows a user to easily see the contents of specific versions of the content item, and can enable the user to decide whether they want to perform a restore action.

Example Restore Action Process

Figure 3:
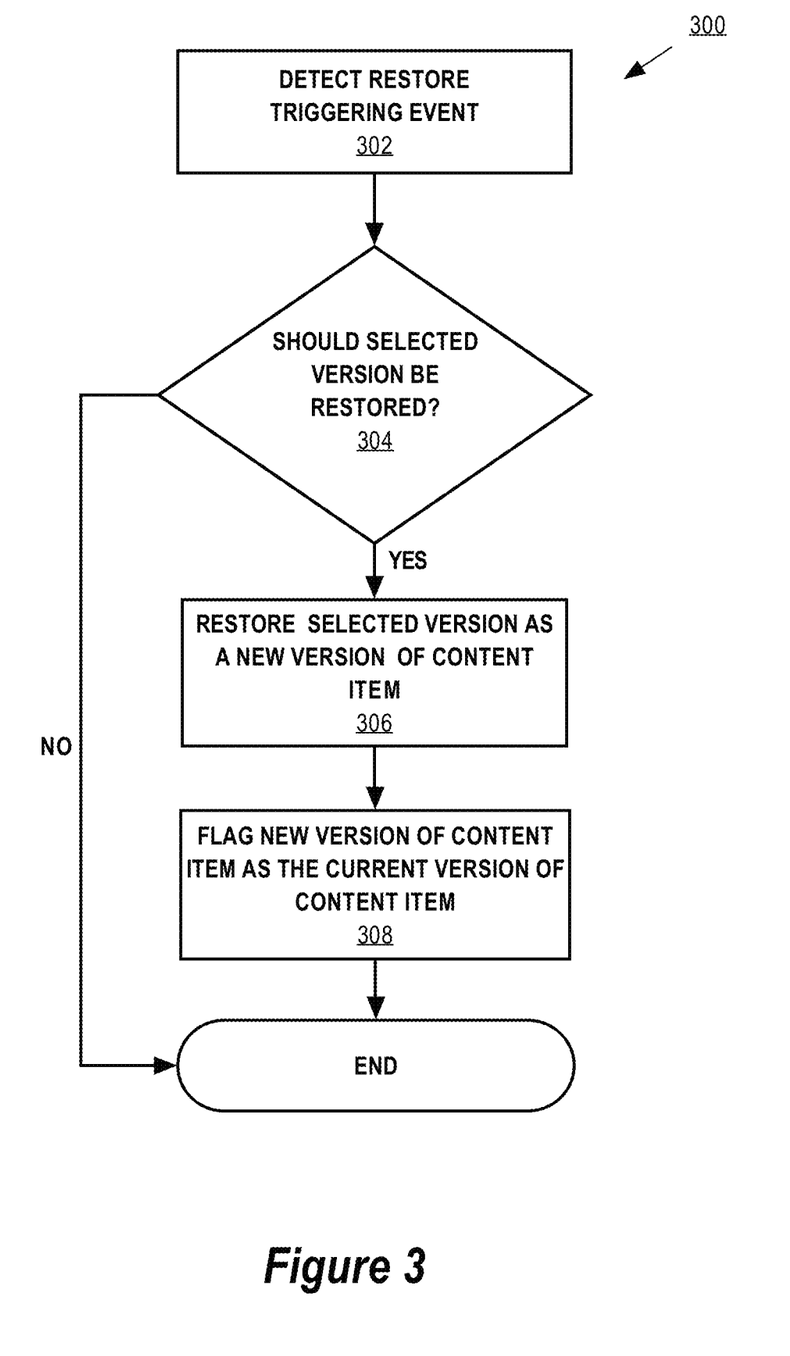
FIG. 3 is a flow diagram of a computer-implemented technique for restoring a version of a content item.

FIG. 3 is a flow diagram of a process 300 for performing a restore action. As to the flow diagram, each block within the flow diagram represents both a method step and an apparatus element for performing the method step. Depending upon the implementation, the corresponding apparatus element may be configured in hardware, software, firmware, or combinations thereof.

In block 302, the process detects a restore triggering event. The restore triggering event identifies the content item that is being restored. The restore triggering event further identifies the currently selected version of a content item, which represents the version of the content item that the user is attempting to restore. A restore triggering event may be generated by the online content management system or collected from a user computing device by the online content management system. For example, a restore triggering event may be generated when a user selects a restore button from the version history user interface or from the preview version user interface.

In block 304, the process determines whether the currently selected version of a content item should be restored. In one embodiment, block 304 always determines that the currently selected version of a content item should be restored and returns "Yes". In another embodiment, in block 304, the process will prompt the user to confirm that they want to restore the currently selected version of a content item. For example, the prompt may include a popup message that prompts the user with a statement: "Restore this version of 'TPS Report' will make it the current version. All old versions will still be saved. Do you want to continue?" The prompt may further include two options for selection by the user: "Confirm" or "Cancel." If the user confirms that they want to restore the currently selected version of a content item, the block 304 returns "Yes". If, in response to the prompt, the user selects the cancel option, the block 304 returns "No".

If, in block 304, it is determined that the currently selected version of the content item should be restored, then the process proceeds to block 306. If, in block 304, it is determined that the currently selected version of the content item should not be restored, then the process may end.

In block 306, the process restores the currently selected version of the content item as a new version of the content item. The process will create a new version of the content item that contains substantially the same data as the currently selected version of the content item. The new version of the content item is a copy of the currently selected version of the content item, and is not merely a reference back to the currently selected version of the content item. The new version of the content item is stored in the online content management system. By creating a new version of the content item, the process ensures that the integrity of the prior versions of the content item are preserved as no other previously saved version of the content item is modified. The process then proceeds to block 308

In block 308, the process will flag the new version of the content item is flagged as the current version of the content item in the online content management system. After block 308, the process may end.

Figure 4:
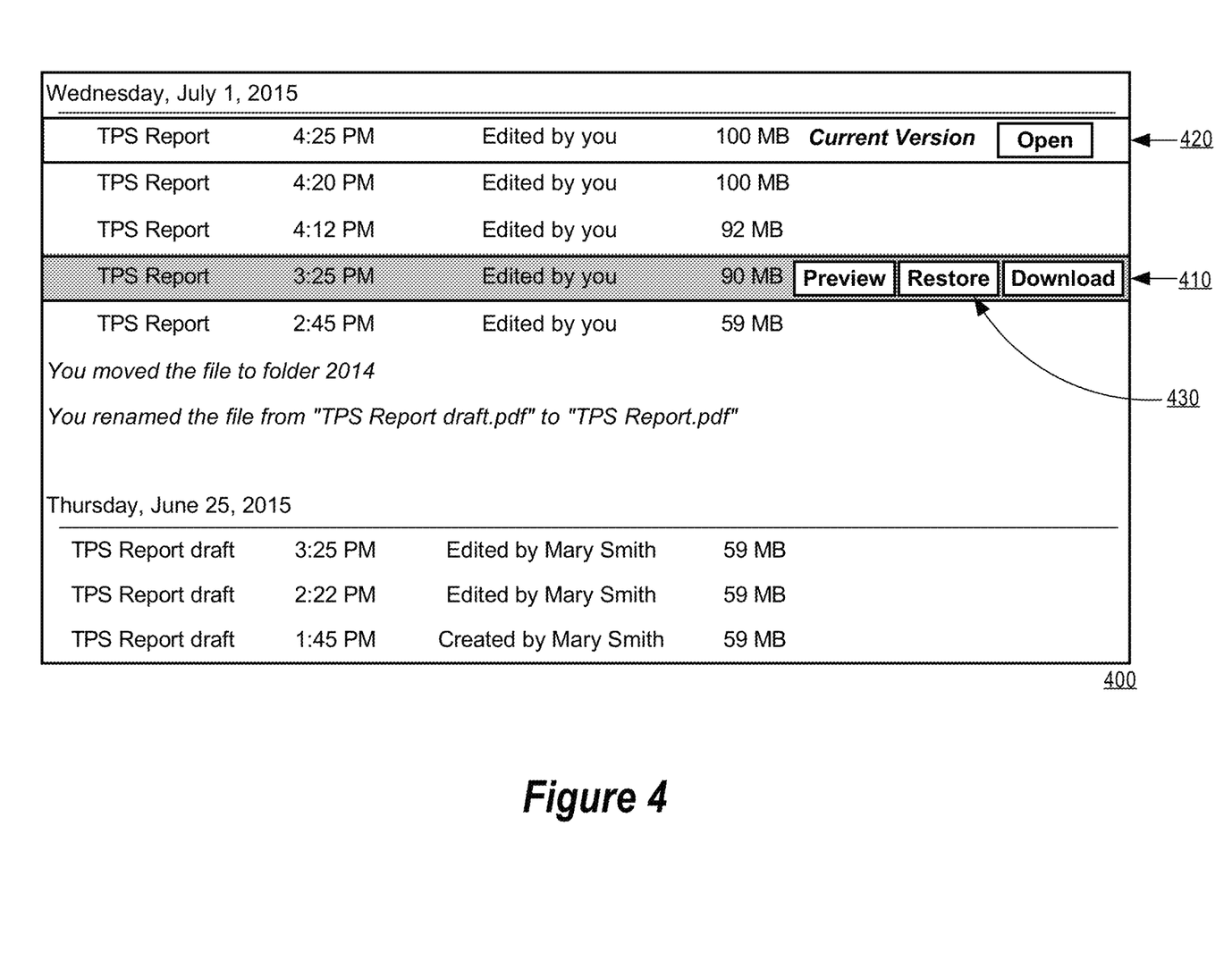
FIG. 4 is a diagram of an example version history user interface.

For example, FIG. 4 depicts an example of the version history user interface 400 before a restore action has occurred. Primary event version history entry 410 identifies the currently selected version of the content item that is being restored as the version that was last edited at 3:25 PM on Wednesday, Jul. 1, 2015. Primary event version history 420 identifies the current version of the content item as being the version that was last edited at 4:25 PM on Wednesday, Jul. 1, 2015. Restore button 430 is the restore button that generates the restore triggering event.

Figure 5:
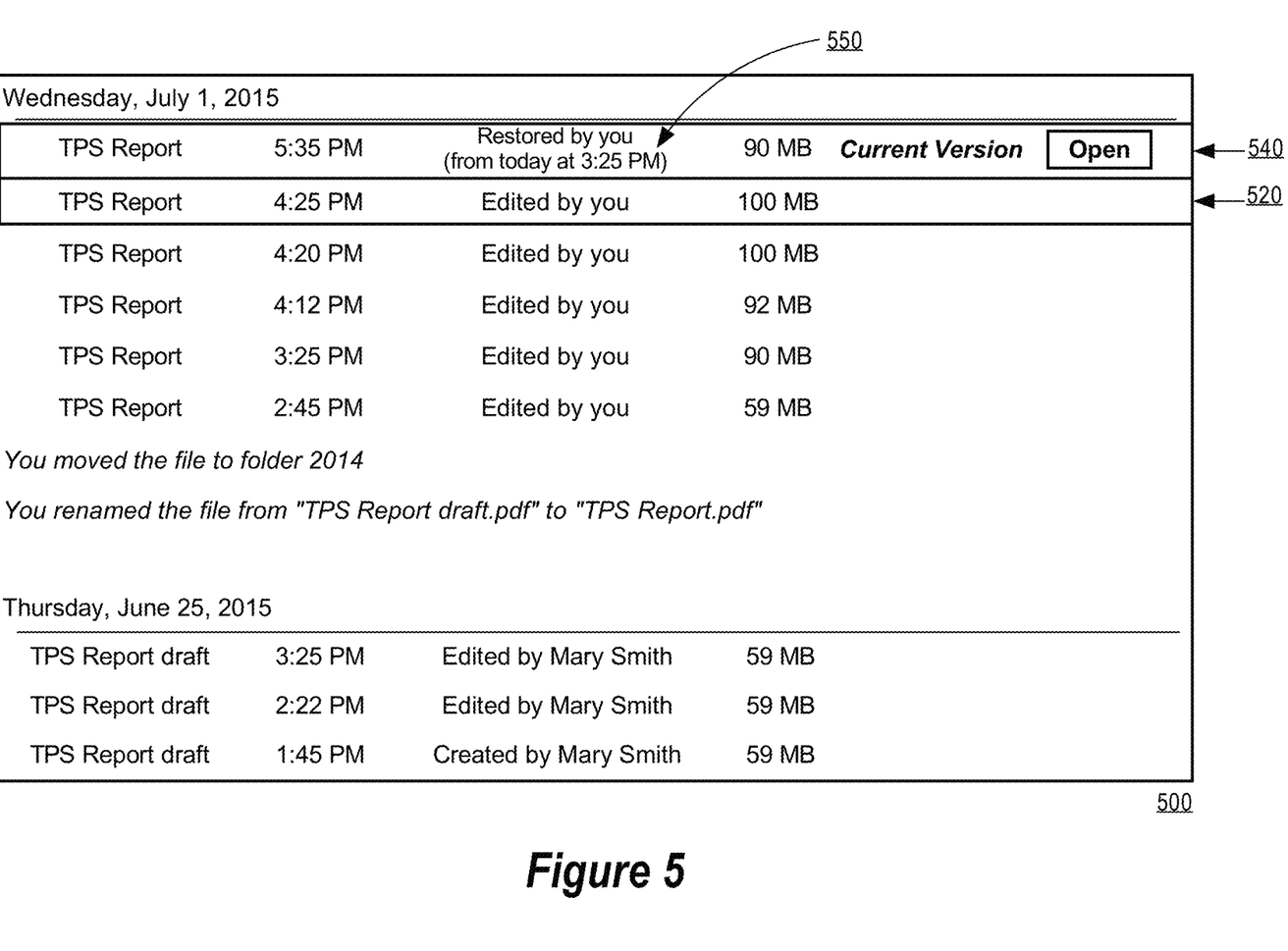
FIG. 5 is a diagram of an example version history user interface.

FIG. 5 depicts an example of the version history user interface after a restore action has successfully completed. Primary event version history entry 520 is no longer identified as the current version of the content item. Instead, a new primary event version history entry 540 identifies the newly created version of the content item that was restored by the process. Primary event version history entry 540 is identified as the current version of the content item. The version of the content item associated with primary event version history entry 520 is maintained by the online content management system and has not been modified by the process. This ensures that a user can subsequently restore from the primary event version history entry 520, if they want to. Additionally, primary event version history entry 540 may optionally include a field 550 that identifies the source of the restored version.

Basic Computing Device

Figure 6:
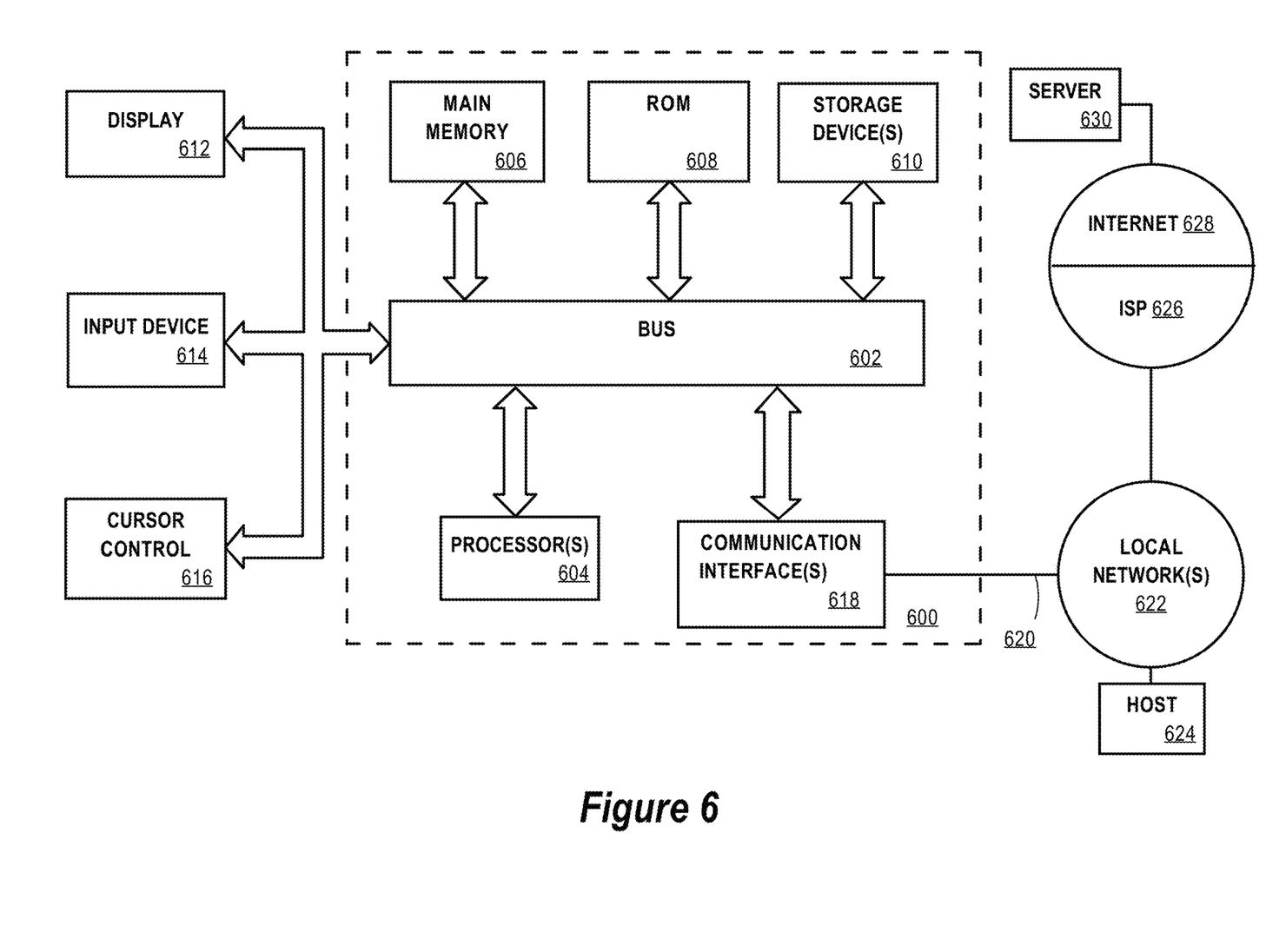
FIG. 6 is a very general block diagram of a computing device in which the example embodiment(s) of the present disclosure may be embodied.

Referring now to FIG. 6, it is a block diagram that illustrates a basic computing device 600 in which the example embodiment(s) of the present disclosure may be embodied. Computing device 600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 600 may include a bus 602 or other communication mechanism for addressing main memory 606 and for transferring data between and among the various components of device 600.

Computing device 600 may also include one or more hardware processors 604 coupled with bus 602 for processing information. A hardware processor 604 may be a general purpose microprocessor, a system on a chip (SoC), or other processor.

Main memory 606, such as a random access memory (RAM) or other dynamic storage device, also may be coupled to bus 602 for storing information and software instructions to be executed by processor(s) 604. Main memory 606 also may be used for storing temporary variables or other intermediate information during execution of software instructions to be executed by processor(s) 604.

Software instructions, when stored in storage media accessible to processor(s) 604, render computing device 600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 600 also may include read only memory (ROM) 608 or other static storage device coupled to bus 602 for storing static information and software instructions for processor(s) 604.

One or more mass storage devices 610 may be coupled to bus 602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 610 (e.g., the main hard disk for the device) stores a body of program and data for directing operation of the computing device, including an operating system, user application programs, driver and other support files, as well as other data files of all sorts.

Computing device 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch gesture (e.g., finger or stylus) input to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

While in some configurations, such as the configuration depicted in FIG. 6, one or more of display 612, input device 614, and cursor control 616 are external components (i.e., peripheral devices) of computing device 600, some or all of display 612, input device 614, and cursor control 616 are integrated as part of the form factor of computing device 600 in other configurations.

Functions of the disclosed systems, methods, and modules may be performed by computing device 600 in response to processor(s) 604 executing one or more programs of software instructions contained in main memory 606. Such software instructions may be read into main memory 606 from another storage medium, such as storage device(s) 610. Execution of the software instructions contained in main memory 606 cause processor(s) 604 to perform the functions of the example embodiment(s).

While functions and operations of the example embodiment(s) may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more software instructions to processor(s) 604 for execution. For example, the software instructions may initially be carried on a magnetic disk or solid-state drive of a remote computer. The remote computer can load the software instructions into its dynamic memory and send the software instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor(s) 604 retrieves and executes the software instructions. The software instructions received by main memory 606 may optionally be stored on storage device(s) 610 either before or after execution by processor(s) 604.

Computing device 600 also may include one or more communication interface(s) 618 coupled to bus 602. A communication interface 618 provides a two-way data communication coupling to a wired or wireless network link 620 that is connected to a local network 622 (e.g., Ethernet network, Wireless Local Area Network, cellular phone network, Bluetooth wireless network, or the like). Communication interface 618 sends and receives electrical, electromagnetic, or optical signals that carry digital data streams representing various types of information. For example, communication interface 618 may be a wired network interface card, a wireless network interface card with an integrated radio antenna, or a modem (e.g., ISDN, DSL, or cable modem).

Network link(s) 620 typically provide data communication through one or more networks to other data devices. For example, a network link 620 may provide a connection through a local network 622 to a host computer 624 or to data equipment operated by an Internet Service Provider (ISP) 626. ISP 626 in turn provides data communication services through the world wide packet data communication network now commonly referred to as the "Internet" 628. Local network(s) 622 and Internet 628 use electrical, electromagnetic or optical signals that carry digital data streams. The signals through the various networks and the signals on network link(s) 620 and through communication interface(s) 618, which carry the digital data to and from computing device 600, are example forms of transmission media.

Computing device 600 can send messages and receive data, including program code, through the network(s), network link(s) 620 and communication interface(s) 618. In the Internet example, a server 630 might transmit a requested code for an application program through Internet 628, ISP 626, local network(s) 622 and communication interface(s) 618.

The received code may be executed by processor 604 as it is received, and/or stored in storage device 610, or other non-volatile storage for later execution.

Basic Software System

Figure 7:
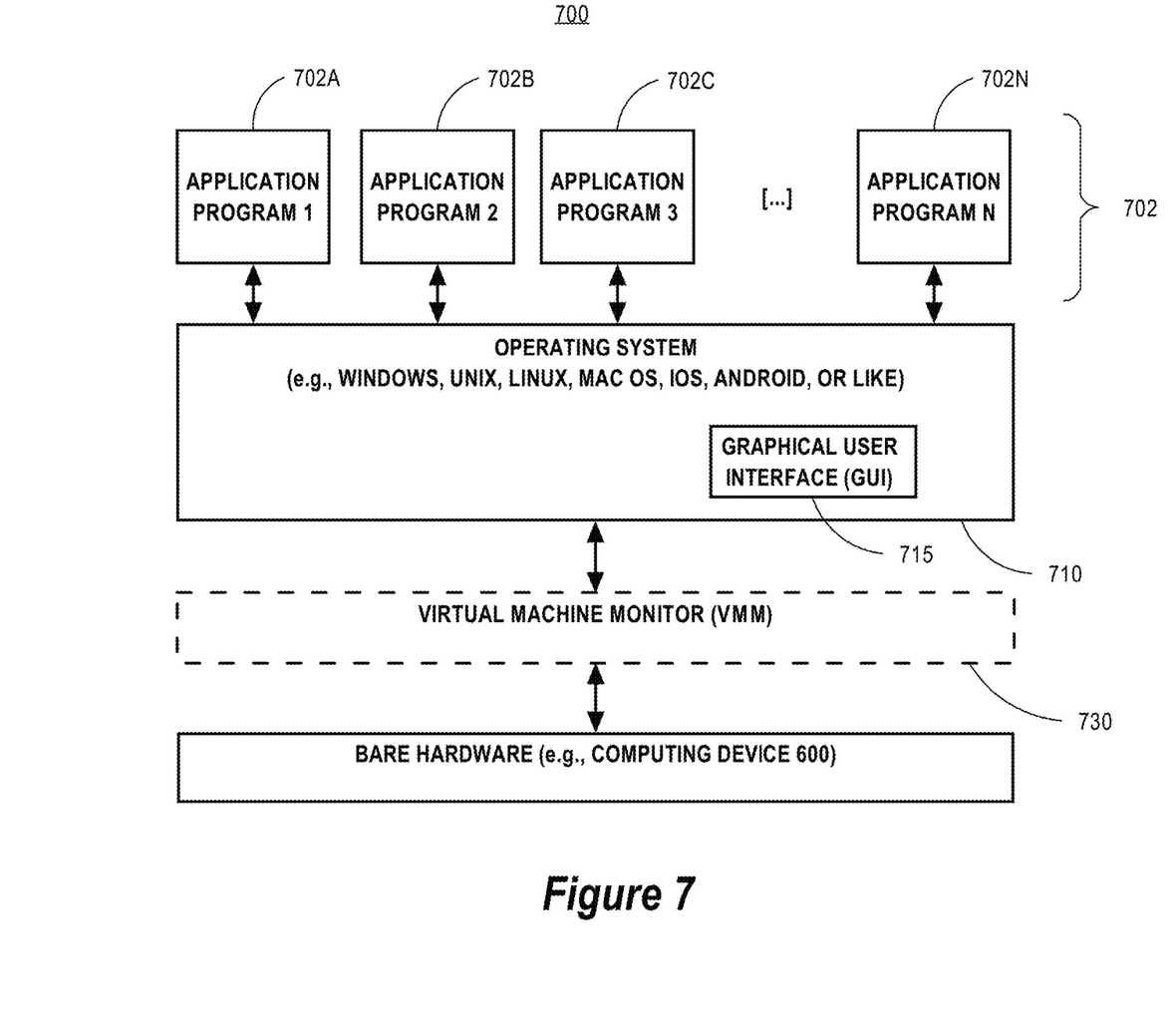
FIG. 7 is a block diagram of a basic software system for controlling the operation of the computing device.

FIG. 7 is a block diagram of a basic software system 700 that may be employed for controlling the operation of computing device 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 600. Software system 700, which may be stored in system memory (RAM) 606 and on fixed storage (e.g., hard disk or flash memory) 610, includes a kernel or operating system (OS) 710.

OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by system 700 in accordance with instructions from operating system 710 and/or application(s) 702. GUI 715 also serves to display the results of operation from OS 710 and application(s) 702, whereupon the user may supply additional inputs or terminate the session (e.g., log off).

OS 710 can execute directly on bare hardware 720 (e.g., processor(s) 604) of device 600. Alternatively, a hypervisor or virtual machine monitor (VMM) 730 may be interposed between bare hardware 720 and OS 710. In this configuration, VMM 730 acts as a software "cushion" or virtualization layer between OS 710 and bare hardware 720 of device 600.

VMM 730 instantiates and runs one or more virtual machine instances ("guest machines"). Each guest machine comprises a "guest" operating system, such as OS 710, and one or more applications, such as application(s) 702, designed to execute on the guest operating system. VMM 730 presents the guest operating systems with a virtual operating platform and manages the execution of the guest operating systems.

In some instances, VMM 730 may allow a guest operating system to run as if it is running on bare hardware 720 of device 600 directly. In these instances, the same version of the guest operating system configured to execute on bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, the example embodiment(s) of the present disclosure have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A computer-implemented method, comprising:
displaying a version history user interface for a content item in an online content management system, the version history user interface displayed comprising one or more primary event version history entries for one or more historical versions of the content item, and one or more anchor event version history entries for the content item;
wherein the one or more primary event version history entries and the one or more anchor event version history entries are concurrently displayed in the version history user interface displayed;
wherein the one or more primary event version history entries have a different visible format than the one or more anchor event version history entries such that the one or more primary event version history entries are visibly distinguishable from the one or more anchor event version history entries in the version history user interface displayed;

wherein the version history user interface provides user interface controls associated with the one or more primary event version history entries;

detecting a restore triggering event corresponding to a selection via the user interface controls of a particular primary event version history entry of the one or more primary event version history entries, wherein the restore triggering event identifies a restoration version of the content item in the online content management system, the restoration version of the content item being one of the one or more historical versions of the content item; and based on detecting the restore triggering event, flagging the restoration version of the content item as a current version of the content item in a version history user interface for the content item.

2. The method of claim 1, wherein flagging the restoration version of the content item as the current version of the content item is based on defining a new version of the content item and identifying the new version of the content item as the current version of the content item, wherein the restoration version of the content item comprises a set of one or more data blocks that make up the restoration version of the content item, and wherein the new version of the content item comprises the set of one or more data blocks.

3. The method of claim 1, wherein the method further comprises:

based on detecting the restore triggering event, displaying a confirmation prompt; and based on detecting the restore triggering event and detecting an affirmative selection of the confirmation prompt, flagging the restoration version of the content item as the current version of the content item in the version history user interface for the content item.

4. The method of claim 1, wherein a particular primary event version history entry of the one or more primary event version history entries corresponds to a content item edit event.

5. The method of claim 4, wherein the method further comprises aggregating multiple content item edit events that occurred over a predetermined time into a primary event version history entry.

6. The method of claim 1, wherein a particular primary event version history entry of the one or more primary event version history entries corresponds to a content item restore event.

7. The method of claim 1, wherein a particular anchor event version history entry of the one or more anchor event version history entries corresponds to: a content item move event, a content item rename event, a content item share, or a content item unshare event.

8. The method of claim 1, wherein a particular anchor event version history entry of the one or more anchor event version history entries corresponds to a content item delete event.

9. A system, comprising:
one or more processors configured to execute instructions to perform functions including:

displaying a version history user interface for a content item in an online content management system, the version history user interface displayed comprising a plurality of primary event version history entries for a plurality of historical versions of the content item and one or more anchor event version history entries for the content item, wherein a first primary event version history entry of the plurality of primary event version history entries is indicated as a current version of the content item;

wherein the plurality of primary event version history entries and the one or more anchor event version history entries are concurrently displayed in the version history user interface displayed;

wherein the plurality of primary event version history entries are displayed in a different format than the one or more anchor event version history entries in the version history user interface displayed such that the plurality of primary event version history entries are visibly distinguishable in the version history user interface displayed from the one or more anchor event version history entries;

wherein the version history user interface provides user interface controls associated with one or more of the plurality of primary event version history entries;

detecting a restore triggering event corresponding to a selection via the user interface controls of a particular primary event version history entry of the plurality of primary event version history entries, wherein the restore triggering event identifies a restoration version of the content item in the online content management system, the restoration version of the content item being one of the one or more historical versions of the content item; and based on detecting the restore triggering event, flagging the restoration version of the content item as a new current version of the content item in a version history user interface for the content item.

10. The system of claim 9, wherein flagging the restoration version of the content item as the new current version of the content item leaves a previous current version of the content item unmodified.

11. The system of claim 9, wherein functions further comprise:

based on detecting the restore triggering event, displaying a confirmation prompt; and based on detecting the restore triggering event and detecting an affirmative selection of the confirmation prompt, flagging the restoration version of the content item as the new current version of the content item in the version history user interface for the content item.

12. The system of claim 9, wherein the version history user interface displayed further comprises a source of the plurality of primary event version history entries.

13. The system of claim 9, wherein the functions further comprise aggregating multiple content item edit events that occurred over a predetermined time into a primary event version history entry.

14. The system of claim 9, wherein the user interface controls are associated with one or more of the plurality of primary event version history entries other than the first primary event version history entry.

15. The system of claim 9, wherein the one or more anchor event version history entries corresponds to a content item rename event.

16. The system of claim 9, wherein the one or more anchor event version history entries corresponds to a content item share or unshare event.

17. One or more non-transitory computer-readable media storing one or more programs, the one or more programs including instructions configured for:

displaying a version history user interface for a content item in an online content management system, the version history user interface displayed comprising one or more primary event version history entries for one or more historical versions of the content item, and one or more anchor event version history entries for the content item;

wherein the one or more primary event version history entries and the one or more anchor event version history entries are concurrently displayed in the version history user interface displayed;

wherein the one or more primary event version history entries have a different visible format than the one or more anchor event version history entries such that the one or more primary event version history entries are visibly distinguishable from the one or more anchor event version history entries in the version history user interface displayed;

wherein the version history user interface provides user interface controls associated with the one or more primary event version history entries;

detecting a restore triggering event corresponding to a selection via the user interface controls of a particular primary event version history entry of the one or more primary event version history entries, wherein the restore triggering event identifies a restoration version of the content item in the online content management system, the restoration version of the content item being one of the one or more historical versions of the content item; and based on detecting the restore triggering event, flagging the restoration version of the content item as a current version of the content item in a version history user interface for the content item.

18. The one or more non-transitory computer-readable media of claim 17, wherein flagging the restoration version of the content item as the current version of the content item is based on defining a new version of the content item and identifying the new version of the content item as the current version of the content item, wherein the restoration version of the content item comprises a set of one or more data blocks that make up the restoration version of the content item, and wherein the new version of the content item comprises the set of one or more data blocks.

19. The one or more non-transitory computer-readable media of claim 17, further wherein:

the version history user interface displayed comprises a plurality of primary event version history entries for a plurality of historical versions of the content item, wherein a first primary event version history entry of the plurality of primary event version history entries is indicated as a current version of the content item; and based on detecting the restore triggering event, flagging the restoration version of the content item as a new current version of the content item in a version history user interface for the content item.

20. The one or more non-transitory computer-readable media of claim 17, wherein flagging the restoration version of the content item as the current version of the content item leaves a previous current version of the content item unmodified.

* * * * *